(12) United States Patent
Chan

(10) Patent No.: US 7,570,482 B2
(45) Date of Patent: Aug. 4, 2009

(54) MOBILE COMPUTER STRUCTURE HAVING ROTATABLE SCREEN

(75) Inventor: Tien-Ming Chan, Taipei (TW)

(73) Assignee: Inventec Corporation, Taipei (TW)

( * ) Notice: Subject to any disclaimer, the term of this patent is extended or adjusted under 35 U.S.C. 154(b) by 231 days.

(21) Appl. No.: 11/709,260

(22) Filed: Feb. 22, 2007

(65) Prior Publication Data
US 2008/0206034 A1  Aug. 28, 2008

(51) Int. Cl.
*G06F 1/16* (2006.01)
(52) U.S. Cl. ............... 361/679.21; 248/917; 348/97; 349/58; 455/575.1
(58) Field of Classification Search ......... 248/917–923, 248/157, 161; 348/97; 349/58; 361/679–687, 361/724–727; 455/575.1, 127.1; 600/309, 600/385, 323, 347
See application file for complete search history.

(56) References Cited

U.S. PATENT DOCUMENTS 6,430,038 B1 * 8/2002 Helot et al. ............. 361/681
2004/0246670 A1 * 12/2004 Lai ......................... 361/683
2006/0256512 A1 * 11/2006 Esther Kang ............ 361/681
2006/0274490 A1 * 12/2006 Cheng .................... 361/683
2007/0035486 A1 * 2/2007 Kasai ...................... 345/76

* cited by examiner

*Primary Examiner*—Hung V Duong
(74) *Attorney, Agent, or Firm*—Rabin & Berdo, P.C.

(57) ABSTRACT

A mobile computer structure having a rotatable screen is provided, which includes a main body, a rotating arm, and a panel. The rotating arm is pivotally disposed on the main body and is pivotally rotated between a first position and a second position. The panel has a display surface and a casing surface and is pivotally connected to the rotating arm. When the rotating arm pivotally rotates to the first position, the panel is attached to the main body with the display surface facing the main body, and when the rotating arm pivotally rotates to the second position, the panel is attached to the main body with the casing surface, thus making the display surface or the casing surface optionally face outside to achieve the purpose of protection or using.

10 Claims, 9 Drawing Sheets

MOBILE COMPUTER STRUCTURE HAVING ROTATABLE SCREEN

BACKGROUND OF THE INVENTION

1. Field of Invention

The present invention relates to a mobile computer structure having a rotatable screen. More particularly, the present invention relates to a mobile computer that uses rotating arms to pivotally rotate to drive the panel to rotate in two directions.

2. Related Art

UMPC, an abbreviation of Ultra Mobile PC, literally means super mobile personal computer. UMPC originates from a program jointly launched by Microsoft and Intel, and it is a palm device with a 7-inch screen, the minimum resolution of 800×480, weighing about 2 pounds (approximately 0.9 kg), having a touch panel and with Wi-Fi and Bluetooth built in, which employs Windows XP Tablet PC Edition 2005 operating system.

FIG. 1 is a schematic structural view of an external appearance of a common UMPC, which includes a host 1 having a display screen 2 disposed thereon. The display screen 2 is a touch-screen display screen. Sometimes, a plurality of functional keys is disposed on the host (not shown). This type of UMPC mainly aims at enabling the user to send a command to the operating system by way of clicking or touching the screen even if he/she is moving, so as to get the required information, and thereby having the work done persistently. However, at present, the common UMPC still has the following unavoidable defects.

Firstly, it is not easy for being operated. As for a UMPC host, operation commands are generally inputted to the operating system by continuously clicking the touch-screen display screen, but sometimes if inputting characters is required, still by means of clicking the touch-screen display screen, characters cannot be input into the operating system as smoothly and quickly as using a keyboard, as a result, the ongoing work may be delayed.

Secondly, even if a sliding cover mechanism is disposed on a mobile computer (i.e., the host is divided into two parts, namely, a main body and a panel, and a sliding element assembly is disposed on the main body and the panel respectively, so that the panel can slide and make a displacement relative to the main body), such that the host has a space for configuring a keyboard or other input elements. But the display screen is still exposed to the air without any protective component, which easily suffers from the crash caused by an external force and thereby being damaged.

SUMMARY OF THE INVENTION

In view of the above, in order to solve the above problems and effectively protect the display screen, and to form the panel and the main body of the mobile computer into different configurations by means of displacing them relative to each other, and meanwhile, in order to configure more command-input elements within a limited space, the present invention provides a mobile computer structure, wherein a rotating mechanism is pivotally connected to the main body and the panel of the mobile computer, and when the rotating structure rotates, it drives the panel and the main body to make a displacement relative to each other, such that the panel is attached to the main body with different surfaces, and the main body can be further disposed with character or command input elements, which enables the user to select corresponding configurations to work under different situations.

The present invention provides a mobile computer structure having a rotatable screen, which comprises a main body, at least one rotating arm, and a panel. The rotating arm is pivotally disposed on the main body and pivotally rotates between a first position and a second position. The panel is divided into a first surface and a second surface and is pivotally connected to the rotating arm. The rotating arm pivotally rotates to drive the panel, such that the panel and the main body are displaced relative to each other. When the rotating arm pivotally rotates to the first position, the first surface is attached to the main body; and when the rotating arm pivotally rotates to the second position, the second surface is attached to the main body.

In the above mobile computer structure, the first surface of the panel serves as a display surface (referring to the display screen), and the second surface serves as a casing surface (i.e., the covering surface of the casing). Particularly, the display surface can be a touch-screen display surface (i.e., the display screen is a touch-screen display screen).

Secondly, the mobile computer structure is disposed with two rotating arms, and the two rotating arms are pivotally connected to the main body and the panel symmetrically through two ends respectively.

Furthermore, a first positioning part and a second positioning part can be disposed on the main body, such that the rotating arm is positioned at the first position or the second position during the pivotally rotating process. Alternatively, an angle-fixing mechanism or a damping mechanism is additionally disposed at a position where the rotating arm is pivotally connected to the main body, such that the pivotally rotating arm forms a first orientation angle or a second orientation angle with the main body, and thus, the rotating arm is positioned at the first position or the second position.

What's more, an engaging slot can be disposed on the main body, and an engaging block can be disposed on the panel. When the rotating arm pivotally rotates to the first position, the engaging block and the engaging slot are engaged with each other, and a specific angle is formed between the panel and the main body (the angle falls between 95 and 105 degrees, which is an angle from which a person feels most comfortable when viewing in front of the panel), or an angle-fixing mechanism or a damping mechanism is additionally disposed at a position where the rotating arm is pivotally connected to the panel, such that when the rotating arm is at the first position, the panel is rotated to form a specific angle with the main body.

In addition, the main body can be disposed with a keyboard, a touch pad, or a touch-screen display panel.

The present invention has effects that cannot be achieved in the prior art.

Firstly, when the panel is attached to the main body with the display surface, only the casing surface is exposed to the open air, so that the display surface is protected from being crashed by an external force, and by way of covering the casing with the casing surface, internal circuits of the panel can also be protected.

Secondly, since the display screen is disposed on the panel, various input elements such as keyboards, touch-screen display panels, or touch pads can be additionally disposed on the main body. Compared with the prior art that only relies on the touch panel to control the input process, the character and command input process in the present invention is much more convenient.

Thirdly, utilizing the pivotally rotating of the rotating arm to drive the panel and the main body to make a displacement relative to each other and thereby being closed to achieve different configurations, it is convenient for the user to change the configuration depending upon different environments, so as to enhance the working efficiency. Compared with the prior art that only has a simple structure design with a single host, the applicability of the present invention is significantly enhanced.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below for illustration only, which thus is not limitative of the present invention, and wherein.

DETAILED DESCRIPTION OF THE INVENTION

In order to make the objectives, construction features, and functions of the present invention be more comprehensible, a detailed description is given below with reference to relevant embodiments and drawings.

Figure 1:
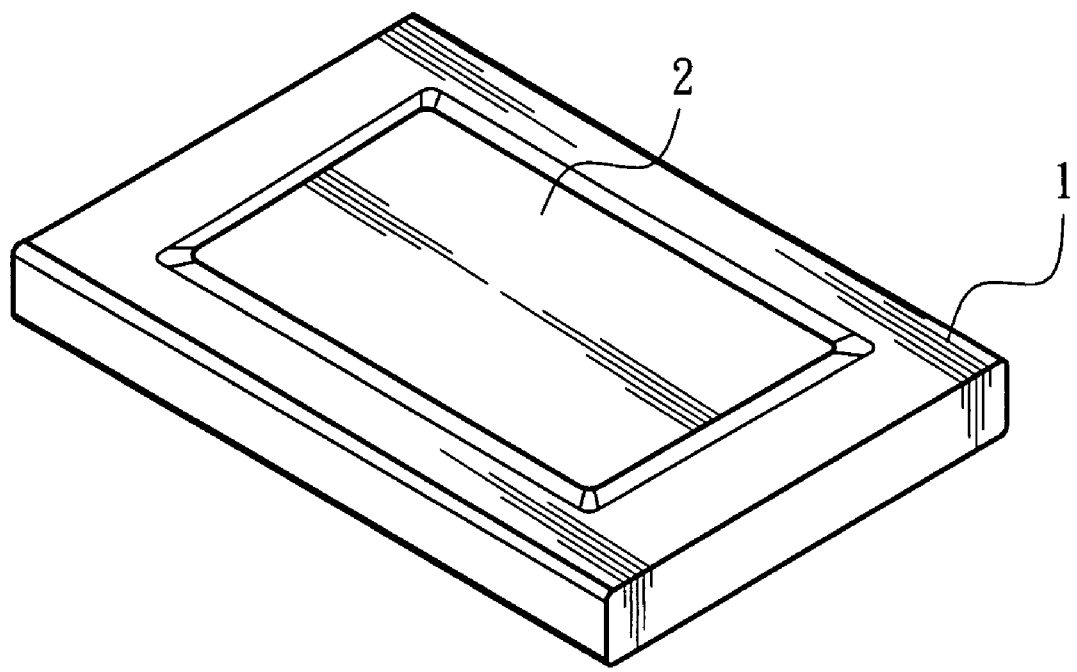
FIG. 1 is a schematic structural view of the prior art.
Figure 2A:
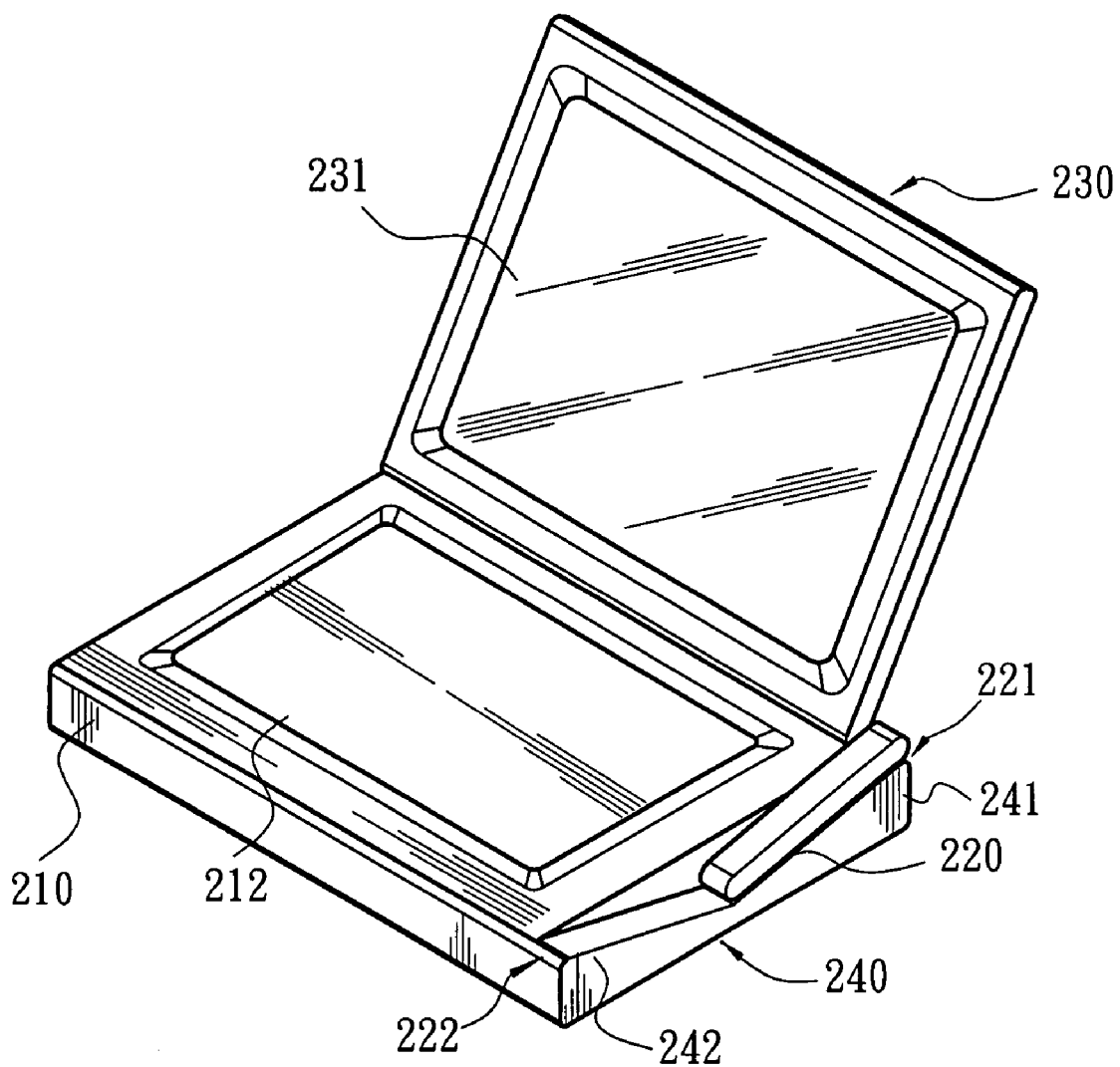
FIG. 2A is a schematic structural view of a first preferred embodiment of the present invention.

FIG. 2A is a schematic structural view of a first preferred embodiment of the present invention. A UMPC structure includes a main body 210, a rotating arm 220, a panel 230, and a positioning block 240.

The main body 210 is disposed with a touch-screen display panel 212 for the user to input commands, and it can also be disposed with a touch pad or a keyboard if needed.

Two ends of the rotating arm 220 are respectively pivotally connected to the main body 210 and the panel 230. In addition, the pivoting joint of the rotating arm 220 and the main body 210 is utilized by the rotating arm 220 as an axle center; therefore, the rotating arm 220 can rotate between a first position 221 and a second position 222.

The panel 230 has a first surface and a second surface. In this embodiment, the first surface is a display surface 231 (i.e., the display screen), and the second surface is a casing surface 232 (not shown in FIG. 2A). In most cases, the display surface 231 is a touch-screen display surface (i.e., the configured display screen is a touch-screen display screen, such that the user can input control commands to the operating system by way of clicking or touching the screen). In addition, when the rotating arm 220 pivotally rotates, it provides force to drive the panel 230 to move, so that the panel 230 can have a displacement relative to the main body 210.

The positioning block 240 is disposed on the main body 210, neighboring the rotating arm 220. It includes a first positioning part 241 and a second positioning part 242. When the rotating arm 220 pivotally rotates, it is engaged with the first positioning part 241 or the second positioning part 242, so as to be positioned at the first position 221 or the second position 222.

Figure 2B:
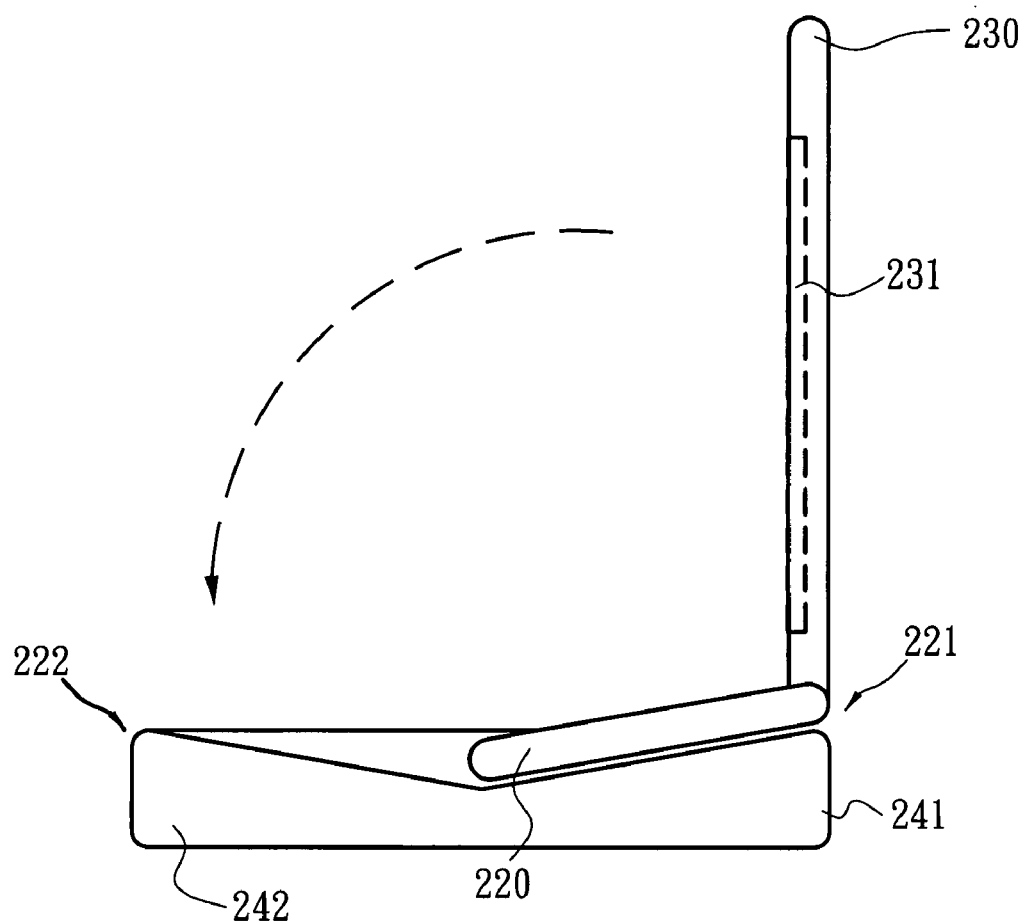
FIG. 2B is a schematic diagram showing a displacement condition of the panel when the display surface of the panel is attached to the main body.
Figure 2C:
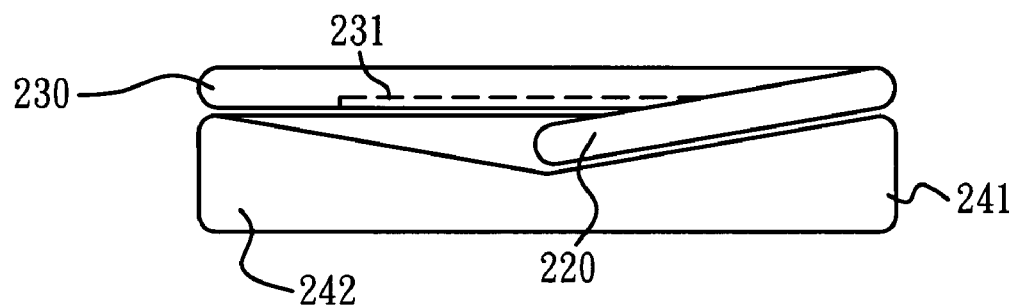
FIG. 2C is a schematic diagram showing that the displace surface of the panel and the main body are close together.

FIG. 2B is a schematic diagram showing a displacement condition of the panel when the display surface of the panel is attached to the main body, and FIG. 2C is a schematic diagram showing that the displace surface of the panel and the main body are close together. When the rotating arm 220 is positioned at the first position 221, the pivoting joint of the panel 230 and the rotating arm 220 is utilized by the panel 230 as an axle center for pivotally rotating. Hence, the display surface 231 of the panel 230 can close toward the main body 210, and the display surface 231 of the panel 230 and the main body are therefore close together.

Figure 2D:
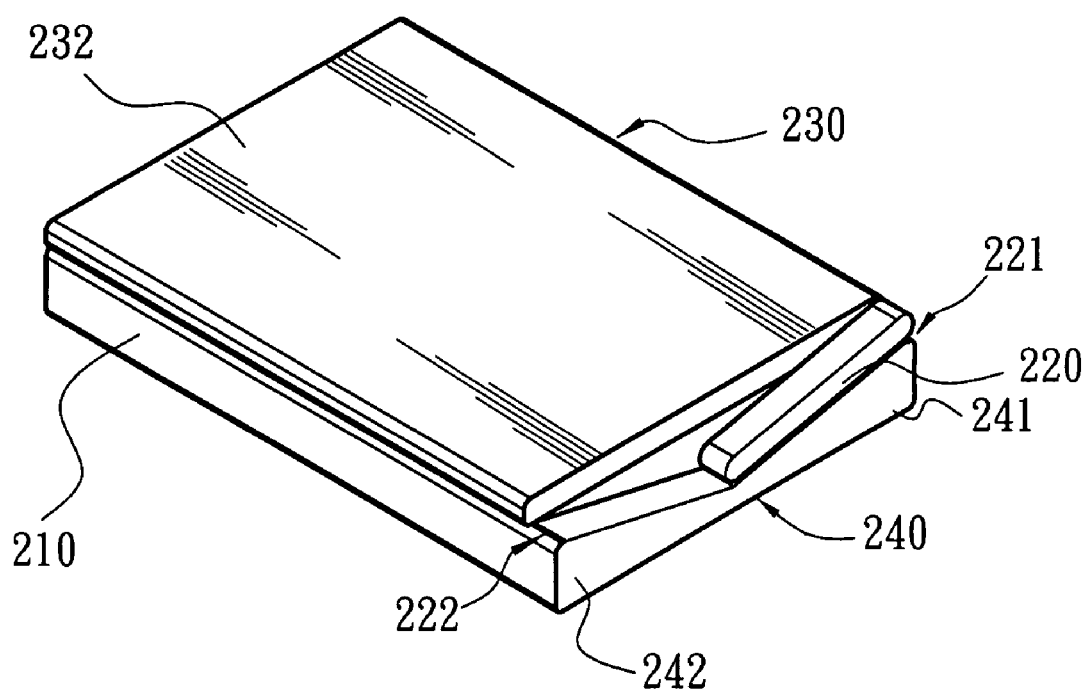
FIG. 2D is a schematic structural view of the present invention with the display surface being attached to the main body.

FIG. 2D is a schematic structural view of the present invention with the display surface 231 being attached to the main body 210. When the panel 230 is closed towards the direction of the main body 210 to make the display surface 231 be attached to the main body 210, a state similar to the closing state of a notebook computer is presented, so as to prevent the display surface 231 of the panel 230 from being broken or scratched due to being crashed by an external force. Besides, the casing surface 232 is utilized by the panel 230 for covering the casing, so as to protect the external circuits of the panel 230, and thereby achieving the objective of the screen protection.

Figure 3A:
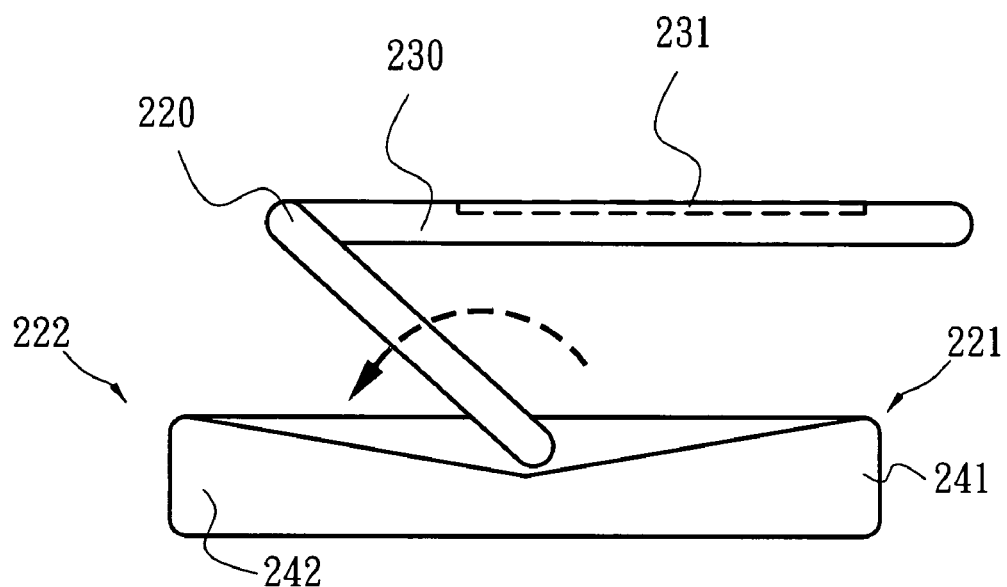
FIG. 3A is a schematic view of the rotating arm of the present invention pivotally rotating towards the second position.
Figure 3B:
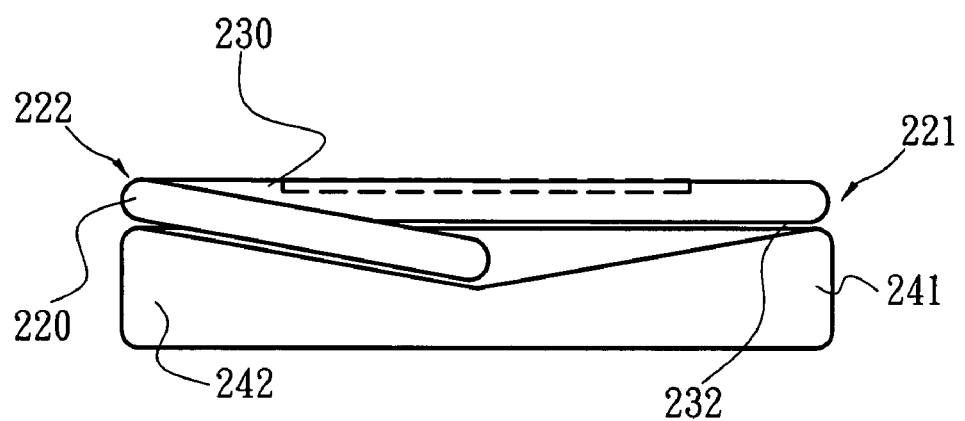
FIG. 3B is a schematic side view showing that the casing surface of the panel and the main body are close together.

Referring to FIGS. 3A and 3B, FIG. 3A is a schematic view of the rotating arm pivotally rotating towards the second position and FIG. 3B is a schematic side view showing that the casing surface of the panel and the main body are close together. If the casing surface 232 of the panel 230 is intended to be attached to the main body 210, the pivoting joint of the rotating arm 220 and the main body is utilized by the rotating arm 220 as an axle center; therefore, the rotating arm 220 can pivotally rotates from the first position 221 to the second position 222, and the rotating arm 220 is positioned by means of the second positioning part 242. Upon the panel 230 being driven by the rotating arm 220, the casing surface 232 is attached to the main body 210.

Figure 3C:
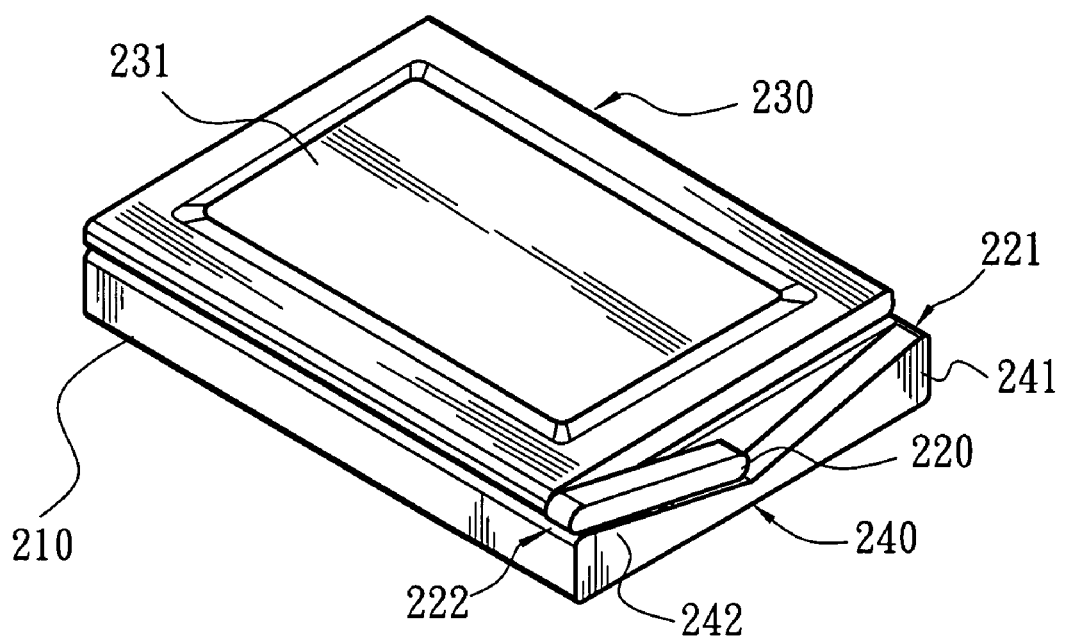
FIG. 3C is a schematic structural view of the present invention with the casing surface being attached to the main body.

FIG. 3C is a schematic structural view of the present invention with the casing surface 232 being attached to the main body 210. When the panel 230 is closed towards the direction of the main body 210 and the casing surface 232 is attached to the main body 210, the overall external structure of the mobile computer is similar to a hand-held device such as a tablet PC or a PDA, which is convenient for the user to continue working by means of clicking the panel 230, even if he/she is moving.

Figure 4:
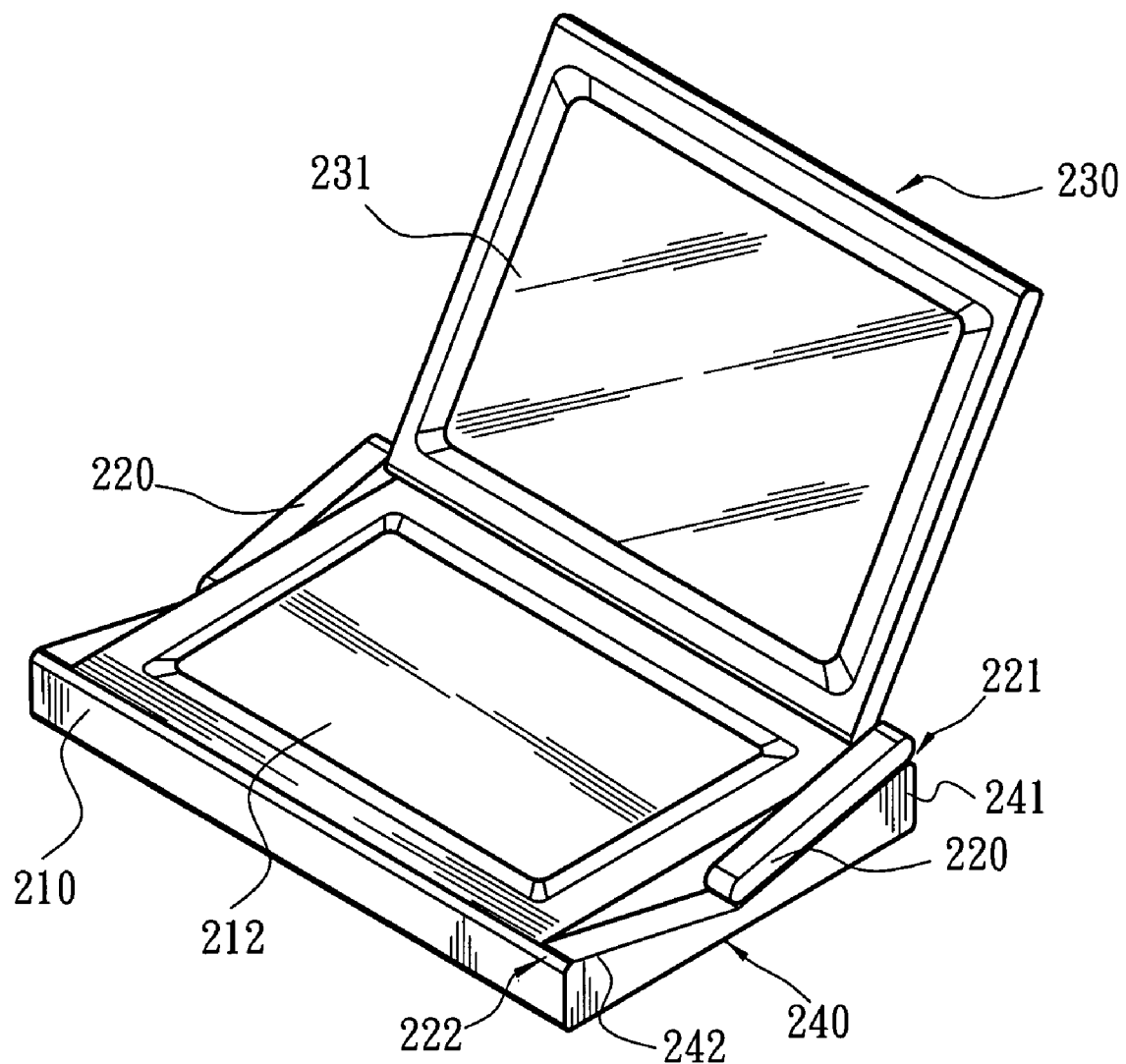
FIG. 4 is a schematic structural view of a second preferred embodiment of the present invention.

FIG. 4 is a schematic structural view of a second preferred embodiment of the present invention. In this embodiment, two rotating arms 220 are disposed. In addition, with respective one ends of the two rotating arms 220 being pivotally connected to the main body 210 as the axle center, each of the two rotating arms 220 is pivotally connected to two corresponding sides of the main body 210 symmetrically, and with the respective other ends corresponding to the panel, the two rotating arms 220 are pivotally connected to two corresponding sides of the panel 230.

The two rotating arms 220 are pivotally connected to the two corresponding sides of the main body 210 and the panel 230 symmetrically, which aims at increasing the balance for the panel 230 to make a displacement while the rotating arm 220 is pivotally rotated. Moreover, the panel 230 is pivotally connected to both two rotating arms 220 at the same time, so even if the panel 230 is in a loose state due to one of the rotating arms being crashed by an external force, the panel still can be driven to make a displacement by means of pivotally rotating the other rotating arm.

Figure 5A:
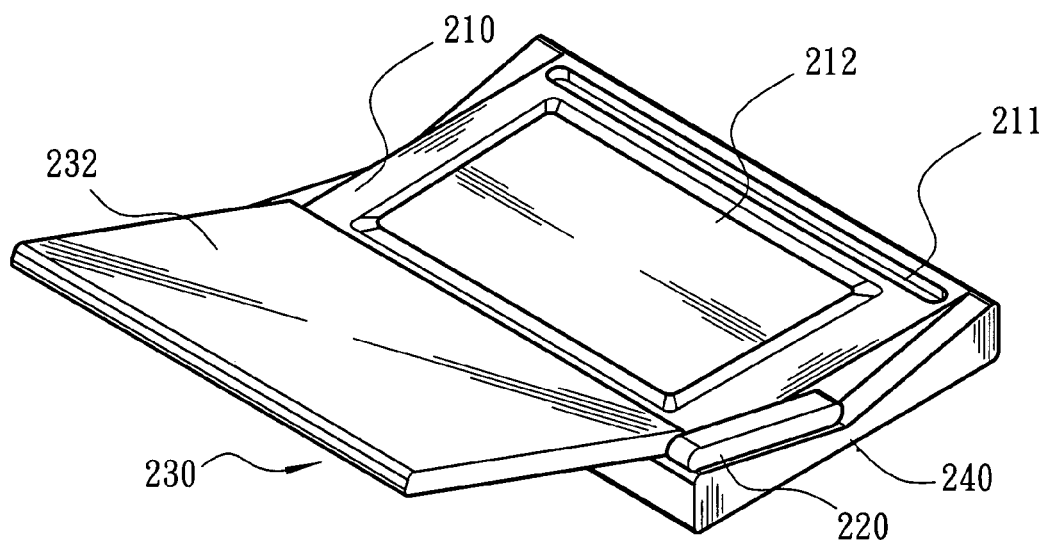
FIG. 5A is a schematic view of the configuration of an engaging slot of the present invention.
Figure 5B:
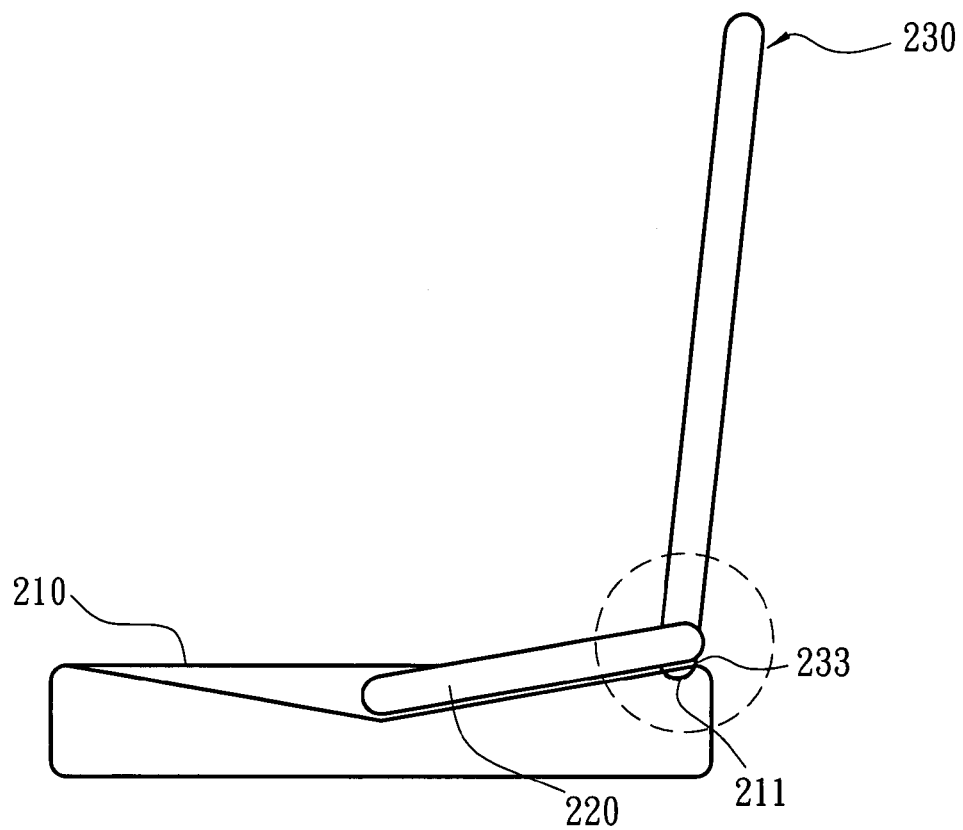
FIG. 5B is a schematic view of the engaging between the engaging slot and the engaging block of the present invention.
Figure 5C:
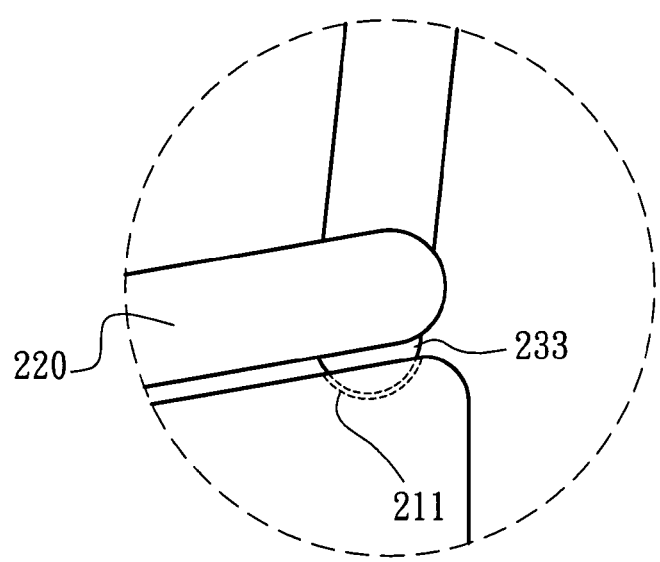
FIG. 5C is a detailed diagram of the engaging between the engaging slot and the engaging block of the present invention.

Referring to FIGS. 5A to 5C together, they are configuration diagrams of the engaging mechanism of the present invention. The main body 210 is disposed with an engaging slot 211, and the panel 230 is disposed with an engaging block 233, such that the engaging block 233 and the engaging slot 211 can be engaged with each other to form a specific angle between the main body 210 and the panel 230 (an angle between 95 degrees and 105 degrees).

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A mobile computer structure having a rotatable screen, comprising:
    a main body;
    at least one rotating arm, pivotally disposed on the main body and pivotally rotating between a first position and a second position; and
    a panel, having a first surface and a second surface and pivotally connected to the rotating arm, wherein when the rotating arm pivotally rotates to the first position, the first surface is attached to the main body; when the rotating arm pivotally rotates to the second position, the second surface is attached to the main body;
    wherein the main body has an engaging slot, the panel has an engaging block, and when the rotating arm pivotally rotates to the first position, the engaging block is engaged with the engaging slot to form a specific angle between the panel and the main body.

2. The mobile computer structure as claimed in claim 1, wherein the first surface is a display surface, and the second surface is a casing surface.

3. The mobile computer structure as claimed in claim 2, wherein the display panel is a touch-screen display surface.

4. The mobile computer structure as claimed in claim 1, wherein the rotating arm has two ends, and the two ends are pivotally connected to the main body and the panel respectively.

5. The mobile computer structure as claimed in claim 1, wherein the mobile computer structure has the two rotating arms, and the two rotating arms are symmetrically pivotally connected to the main body and the panel respectively with two ends of the two rotating arms.

6. The mobile computer structure as claimed in claim 1, wherein the main body further has a first positioning part used to position the rotating arm when the rotating arm pivotally rotates to the first position.

7. The mobile computer structure as claimed in claim 1, wherein the main body further has a second positioning part used to position the rotating arm when the rotating arm pivotally rotates to the second position.

8. The mobile computer structure as claimed in claim 1, wherein the mobile computer structure further comprises an angle-fixing mechanism, disposed at a position where the rotating arm is pivotally connected to the main body, for forming a first orientation angle between the rotating arm and the main body and positioning the rotating arm at the first position.

9. The mobile computer structure as claimed in claim 1, wherein the mobile computer structure further comprises an angle-fixing mechanism, disposed at a position where the rotating arm is pivotally connected to the main body, for forming a second orientation angle between the rotating arm and the main body and positioning the rotating arm at the second position.

10. A mobile computer structure having a rotatable screen comprising:
    a main body having an engaging slot and having an engaging block symmetrically disposed at each of two corresponding ends, wherein each of the engaging blocks has a first positioning part and a second positioning part;
    two rotating arms, with two ends of the two rotating arm respectively being pivotally connected to the main body symmetrically, wherein with a pivoting joint of the main body and the rotating arms as an axle center, the rotating arms pivotally rotate between a first position and a second position; and
    a panel, having a display surface, a casing surface, and an engaging block, wherein the rotating arms are symmetrically and pivotally connected to two corresponding ends of the panel; when the rotating arms pivotally rotate to the first position, the display surface is attached to the main body, and by way of engaging the engaging block with the engaging slot, a specific angle is formed between the panel and the main body; and when the rotating arms pivotally rotate to the second position, the casing surface is attached to the main body.

* * * * *